Patented May 23, 1950

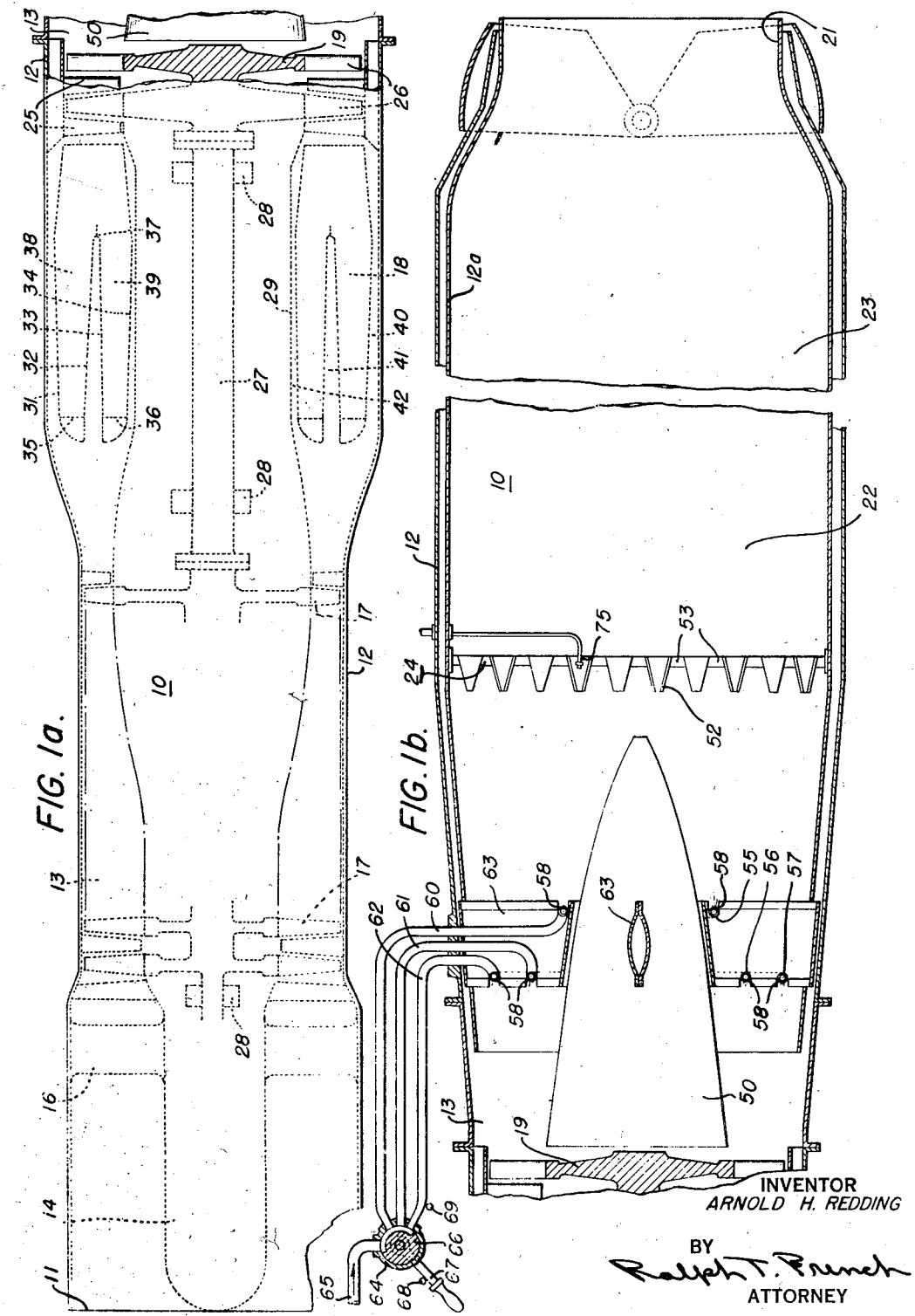

2,508,420

UNITED STATES PATENT OFFICE 2,508,420

COMBUSTION APPARATUS

Arnold H. Redding, Swarthmore, Pa., assignor to Westinghouse Electric Corporation, East Pittsburgh, Pa., a corporation of Pennsylvania Application September 21, 1948, Serial No. 50,378

6 Claims. (Cl. 60—44)

This invention relates to combustion apparatus, more particularly to fuel supply mechanism therefor, and has for an object to provide improved apparatus of this character.

In aviation gas turbine power plants, as well as other power plants utilizing large quantities of air, a problem exists due to the fact that while it is desirable and necessary to vary the power output of the power plant, it usually is impractical to vary materially the supply of air to the plant. Consequently, control of the power output is usually effected primarily by varying the quantity of fuel supplied to the combustion chamber or chambers. However, changes in the quantity of fuel supplied to the power plant without corresponding change in the quantity of air supplied renders it impossible to maintain a proper fuel-air ratio under all conditions of power output.

With the fuel supply materially reduced the fuel-air mixture becomes lean and combustion becomes unstable. The present invention overcomes this difficulty by supplying the fuel to the air or gas stream at a plurality of zones considered transversely of the air or gas flow path through the combustion chamber, and when the quantity of fuel is to be reduced, the supply to certain zones is cut off entirely and the supply to the remaining zones continued at maximum value, thereby producing substantially correct fuel-air and/or gas ratio in the remaining zones, with consequent stable combustion therein.

Accordingly, another object of the invention is to provide means for maintaining substantially correct local fuel-air and/or gas ratio in combustion power plants unequipped with means for accurately controlling the air and/or gas supply.

A further object of the invention is to provide a fuel supply system for a combustion chamber, which system supplies the fuel to any or all of a plurality of zones in the chamber.

Yet another object of the invention is to provide a combustion chamber fuel supply system including means for progressively reducing the number of zones in the chamber to which fuel is supplied.

Another object of the invention is to provide a fuel supply system for the tail burner of a jet propulsion power plant, which system includes a plurality of radially-spaced nozzle rings together with means for cutting off the fuel supply to the rings progressively from the outermost to the innermost.

Yet another object of the invention is to provide for step-by-step starting of combustion, resulting in reduced shock at starting.

A further object of the invention is to provide a tail burner for an aircraft power plant, which tail burner includes a fuel supply system providing for step-by-step starting, rendering it possible to start the tail burner at higher altitudes than would be possible with instantaneous complete combustion at starting.

These and other objects are effected by the invention as will be apparent from the following description and claims taken in connection with the accompanying drawing, forming a part of this application, in which:

Figs. 1a and 1b, taken together, constitute a side elevational view of an aviation gas turbine power plant constructed in accordance with the present invention, Fig. 1b being in longitudinal section to more clearly show novel features of the invention.

The present invention, while not limited thereto, is particularly adapted for use with a gas turbine power plant of the type employed on aircraft to drive the propeller or an electric generator and/or to supply motive fluid for jet propulsion of the aircraft.

Such a plant preferably comprises a streamlined tubular casing having mounted axially therein a compressor adjacent the forward or inlet end, a turbine in the rearward part of the power plant, and combustion apparatus located between the compressor and the turbine for heating the compressed air and which discharges the hot gases at suitable temperature and pressure to the turbine. After leaving the turbine the gases are discharged through a nozzle provided at the rear of the casing and may aid in propelling the aircraft.

Referring now to the drawing more in detail the power plant shown in Figs. 1a and 1b, and indicated in its entirety by the reference character 10, is adapted to be mounted in or on the fuselage or wing of an aircraft with the left end or intake 11, as viewed in Fig. 1a, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor 17, and a nozzle 21 defined by the rear end of the casing 12a. Additionally, the passage 13 provides a combustion space 22 for a tail burner 23 located between the turbine 19 and the exhaust nozzle 21, in which space is positioned a flame holder 24.

Air enters the power plant at the intake 11 and flows substantially straight through the plant, passing through the compressor 17 where its pressure is raised, and into the combustion apparatus 18 where it is heated. The hot gases, comprising the products of combustion and excess air heated by the combustion, on leaving the combustion apparatus are directed by suitable guide vanes or nozzles 25 against the blades 26 of the turbine and then are discharged through the nozzle 21 to propel the aircraft.

By reference to Fig. 1a it will be seen that the compressor and turbine rotors are interconnected by a shaft 27 supported by suitable bearings 28 and enclosed by an inner wall structure, generally indicated 29, which protects the shaft and bearings from high temperatures and also defines a portion of the annular air flow passage 13 in which the combustion apparatus 18 is located.

The combustion apparatus 18 comprises annular walls 31, 32, 33 and 34, the walls 31 and 32 being joined at their upstream ends by an end wall 35 and the walls 33 and 34 being similarly joined at their upstream ends by the wall 36. The walls 32 and 33 are joined at their downstream ends, as at 37, whereby there are provided annular burner spaces 38 and 39 overlapped by annular air spaces 40, 41 and 42. Fuel is supplied to the burner spaces 38 and 39 by annular series of nozzles (not shown) carried by the end walls 35 and 36.

The above-described combustion apparatus 18 does not incorporate the novel features of the present invention, but it will be apparent, from the following disclosure, that this apparatus 18 could utilize the invention, if desired. It is merely for the sake of simplicity of disclosure that the combustion apparatus 18 has been illustrated conventionally, and the novel features shown only in connection with the tail burner 23.

Referring now to Fig. 1b, a tail cone 50 is positioned immediately downstream of the turbine 19 and cooperates with the outer casing 12—12a to define the downstream portion of the annular flow passage 13. Downstream of the tail cone to passage 13 is circular in cross section and of a length to provide for proper burning of the fuel prior to exhausting through the nozzle 21.

The flame holder 24 may be of any desired construction, and as herein illustrated, comprises a grid arrangement disposed generally transversely of the combustion space 22 and including a multiplicity of hollow frusto-conical members 52 with their longitudinal axes parallel to the longitudinal axis of the power plant. These members 52 are spaced transversely of the combustion space and are interconnected adjacent their base portions by a network of ribs 53.

Inasmuch as the gases exhausting from the turbine pass through the tail burner at velocities in excess of 50 feet per second, it is desirable that fuel be supplied to the gas stream well upstream of the flame holder so that the fuel and gases will have time in which to properly mix before reaching the flame zone downstream of the flame holder. Accordingly, a plurality of annular fuel manifolds 55, 56 and 57 are arranged coaxially about the tail cone 50 in radially-spaced relation to one another. Each annular manifold has an annular series of nozzles 58 for directing fuel into the gas stream flowing therepast. Preferably, the innermost manifold 55 directs its fuel downstream, while the remaining manifolds 56 and 57 discharge fuel upstream.

The fuel manifolds 55, 56 and 57 are supplied with fuel through condiuts 60, 61 and 62, respectively, these conduits being housed in one of the hollow struts 63 by which the tail cone 50 is supported from the power plant casing.

The three fuel supply conduits 60, 61 and 62 communicate, at their upstream ends, with a control valve 64 which receives fuel under pressure from any conventional source (not shown) through the conduit 65. Adjustment of the valve's rotary member 66 by movement of the manually-operable lever 67 between limits determined by the stops 68 and 69 varies the fuel supply to the tail burner from full flow to zero flow.

It will be apparent from consideration of the valve passage arrangement, as shown in Fig. 1b, that movement of the valve from fully open position with the lever 67 abutting the stop 68, to fully closed position with the lever abutting the other top 69, will shut off the fuel supply to the various manifolds progressively, starting with the outermost (57) and ending with the innermost (55). In other words, when the valve is moved one-third of the way from fully open position towards closed position, flow of fuel to the outer manifold 57 is cut off with the result that gases flowing in the outermost annular zone of the gas flow path through the tail burner receive no fuel while the gases flowing through the remaining zones receive all of the fuel being supplied, resulting in substantially correct local fuel-air and/or gas ratio in the latter zones.

Similarly, as the valve is moved the second third of the way from open towards closed position, flow of fuel to the intermediate manifold 56 is terminated, and all of the fuel supplied is fed to the innermost zone of the combustion chamber through the innermost manifold 55. Conversely, upon increase of the fuel supply from minimum to maximum, fuel is supplied to the various manifolds progressively from the innermost to the outermost, thereby maintaining substantially proper fuel-air and/or gas ratio at the zone or zones where combustion takes place.

From the preceding description it will be noted that in initiating combustion in the tail burner, fuel is first supplied to the innermost manifold 55 and thence to the zone immediately downstream thereof. Accordingly, a suitable ignition device 75 is associated with the flame holder and is so disposed radially of the combustion chamber as to be directly downstream of the innermost gas flow zone fed by the innermost manifold 55, thereby providing ignition initiating means in the path of the initial fuel-gas and/or air mixture.

While the invention has been shown in but one form, it will be obvious to those skilled in the art that it is not so limited, but is susceptible of various other changes and modification without departing from the spirit thereof.

What is claimed is:

1. In combustion apparatus, annular wall structure defining a combustion chamber, a plurality of annular series of fuel supply devices disposed in said combustion chamber, said annular series being located different distances radially from the axial centerline of the annular wall structure defining the combustion chamber, a fuel supply line for each of said annular series of fuel supply devices, and fuel supply control mechanism associated with said fuel supply lines for effecting reduction of the supply of fuel to the combustion chamber by cutting off the fuel to the plurality of annular series progressively from the outermost annular series to the innermost series, thereby maintaining approximately correct local fuel-air ratio at the zone of combustion.

2. In combustion apparatus, annular wall structure defining a combustion chamber open at opposite ends for flow of air and/or gases therethrough; a plurality of devices for supplying fuel to the upstream portion of said combustion chamber at a plurality of annular zones which are located different distances radially from the axial centerline of the annular wall structure; means for supplying fuel to each of said devices; and control mechanism associated with the last-mentioned means for varying the supply of fuel to said devices, said control mechanism being so constructed and so associated with the fuel supply means that decrease in the quantity of fuel supplied occurs progressively from the outermost annular zone toward the innermost annular zone and increase in the quantity of fuel supplied occurs progressively from the innermost annular zone to the outermost annular zone.

3. In combustion apparatus, annular wall structure defining a combustion chamber having openings at opposite ends for flow of air and/or gases therethrough, a plurality of annular fuel-feeding structure disposed in the upstream portion of the combustion chamber at progressively varying distances radially from the longitudinal axis of said annular wall structure and arranged concentrically with respect to said axis, means for supplying fuel independently to each of said annular fuel-feeding structures, and control mechanism for said fuel-supply means for shutting off the supply to said plurality of fuel-feeding structures progressively from the outermost to the innermost, whereby substantially correct fuel-air and/or gas ratio near the central portion of the combustion chamber may be obtained, with consequent stable burning.

4. In combustion apparatus, annular wall structure defining a combustion chamber having openings at opposite ends for flow of air and/or gases therethrough, first, second and third annular fuel manifolds in the upstream portion of the combustion chamber, said manifolds being disposed generally concentric with respect to the annular wall structure with the first manifold radially inward of the second and third manifolds and the third manifold radially outward of the first and second manifolds, means for directing fuel from the manifolds into the air and/or gas flowing therepast, means for supplying fuel to each of said manifolds, and control mechanism associated with said fuel-supply means for cutting off the supply of fuel progressively from the third manifold to the first manifold and for turning on the supply of fuel progressively in the reverse order.

5. Structure as specified in claim 4, wherein at least one manifold directs fuel upstream and at least one manifold directs fuel downstream.

6. Structure as specified in claim 4, wherein the first manifold directs fuel downstream and the second and third manifolds direct fuel upstream.

ARNOLD H. REDDING.

No references cited.